US011051283B2

(12) United States Patent
Baldemair et al.

(10) Patent No.: US 11,051,283 B2
(45) Date of Patent: Jun. 29, 2021

(54) SCHEDULED UCI TRANSMISSION SCHEME

(71) Applicant: Telefonaktiebolaget LM Ericsson (publ), Stockholm (SE)

(72) Inventors: Robert Baldemair, Solna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/338,325

(22) PCT Filed: Sep. 29, 2017

(86) PCT No.: PCT/EP2017/074861
§ 371 (c)(1),
(2) Date: Mar. 29, 2019

(87) PCT Pub. No.: WO2018/060473
PCT Pub. Date: Apr. 5, 2018

(65) Prior Publication Data
US 2020/0029323 A1      Jan. 23, 2020

Related U.S. Application Data

(60) Provisional application No. 62/402,405, filed on Sep. 30, 2016.

(51) Int. Cl.
*H04W 72/04* (2009.01)
*H04L 1/18* (2006.01)
*H04L 5/00* (2006.01)

(52) U.S. Cl.
CPC ....... *H04W 72/0413* (2013.01); *H04L 1/1896* (2013.01); *H04L 5/0012* (2013.01); *H04L 5/0042* (2013.01)

(58) Field of Classification Search
None
See application file for complete search history.

(56) References Cited

U.S. PATENT DOCUMENTS

2010/0110929 A1* 5/2010 Li ..................... H04L 5/0032
370/254
2010/0195575 A1   8/2010 Papasakellariou et al.
(Continued)

FOREIGN PATENT DOCUMENTS

CN      103796318 A      5/2014
CN      104471886 A      3/2015
(Continued)

OTHER PUBLICATIONS

LG Electronics, "Discussion on frame structure for NR", 3GPP TSG RAN WG1 Meeting #85, Nanjing, China, May 23-27, 2016, R1-164560.
(Continued)

*Primary Examiner* — Christine T Duong
(74) *Attorney, Agent, or Firm* — Coats & Bennett, PLLC

(57) ABSTRACT

A radio network device is operative to transmit uplink data on a physical uplink shared channel aggregating two or more contiguous slots. The device is further operative to transmit, in addition to the uplink data, Uplink Control Information (UCI) in at least one of the aggregated slots. The UCI may comprise a HARQ ACK/NACK. The UCI is configured in response to Downlink Control Information (DCI) received from a serving network node. The DCI also includes a UL scheduling grant for the physical uplink channel. The UCI may be configured in the physical uplink channel transmission in a variety of ways. Various amounts of frequency resource (e.g., subcarriers) may be allocated to UCI. The subcarriers may be non-contiguous. In slot aggregation, the UCI subcarriers may frequency hop from slot to slot. The UCI may be encoded differently in different slots, to facili-
(Continued)

tate early decoding by a receiver (which may, for example immediately prepare a re-transmission in the case of a NACK).

24 Claims, 18 Drawing Sheets

(56) References Cited

U.S. PATENT DOCUMENTS

| | | |
|---|---|---|
| 2013/0250924 A1 | 9/2013 | Chen et al. |
| 2013/0315212 A1 | 11/2013 | Sorrentino |
| 2014/0098780 A1* | 4/2014 | Kim ............... H04L 5/0055 370/329 |
| 2017/0347361 A1 | 11/2017 | Tsuboi et al. |
| 2018/0205525 A1* | 7/2018 | He ................. H04L 1/1864 |
| 2019/0036586 A1* | 1/2019 | Bradford ........... H04L 5/0044 |

FOREIGN PATENT DOCUMENTS

| | | |
|---|---|---|
| WO | 2016048595 A1 | 3/2016 |
| WO | 2016111219 A1 | 10/2017 |

OTHER PUBLICATIONS

CATT, "Remaining issues on PUCCH for Rel-13 MTC UEs", 3GPP TSG RAN WG1 Metting #83, Anaheim, USA, Nov. 15-22, 2015, R1-156562.

Ericsson, "On scheduled DL HARQ feedback transmission in UL", TSG RAN WG1 #86bis, Lisbon, Portugal, Oct. 10-14, 2016, R1-16xxxx.

Sequans Communications, "Higher data rates for feMTC", 3GPP TSG RAN WG1 Meeting #86, Gothenburg, Sweden, Aug. 22-26, 2016, R1-166625.

* cited by examiner

DATA RECEIVING MODULE
66

UCI RECEIVING MODULE
68

*FIG. 21*

DATA TRANSMITTING MODULE
70

UCI TRANSMITTING MODULE
72

*FIG. 22*

SCHEDULED UCI TRANSMISSION SCHEME

This application claims priority to U.S. Provisional Patent Application Ser. No. 62/402,405, titled "Scheduled UCI Transmission Scheme," filed 30 Sep. 2016, the disclosure of which is incorporated herein by reference in its entirety.

TECHNICAL FIELD

The present invention relates generally to wireless communications, and in particular to a system and method of transmitting Uplink Control Information.

BACKGROUND

Wireless communication networks, and radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

One principle of prior and existing wireless communication network protocols is the separation of user data, such as voice, text, email, audio, video, and the like, from network overhead, such as power control, mobility management, authentication, error control, and the like. Nodes, circuits, and links handling user data are referred to as the "user plane," and those handling network overhead are referred to as the "control plane."

The basic structure of the Radio Access Network in modern wireless communication networks, particularly cellular networks, is a plurality of fixed network nodes, known variously as base stations, eNodeBs (eNB), and the like, each providing service to fixed or mobile radio network devices over a geographic area (sometimes called a cell). There are two primary directions of transmission in these networks: downlink transmissions from a base station to a radio network device, and uplink transmission from a radio network device to the base station. There may also be sidelink transmissions—i.e. device-to-device or network node-to-node. To avoid interference between the two primary directions of transmission, modern wireless communication network protocols provide for operation using either Frequency Division Duplex (FDD), wherein uplink and downlink transmissions occur simultaneously on separate frequencies, or Time Division Duplex (TDD), wherein uplink and downlink transmissions occur on the same frequencies, but at different times.

Due to the inherent vagaries of radio communication (e.g., Rayleigh fading, multipath propagation, Doppler shifts for moving devices, and the like), most wireless communications include errors. Accordingly, a number of techniques have been developed to mitigate errors, such as forward error-correcting coding, error-detecting codes such as cyclic redundancy check (CRC), and automatic transmission acknowledgement/retransmission requests. Hybrid Automatic Repeat Request (HARQ) is an error mitigation protocol that combines all three techniques. In the HARQ protocol, a receiver demodulates and decodes a received signal (correcting what errors it can by virtue of the error-correction coding), generates a local CRC, and compares it to the received CRC. If the two CRCs match, the receiver transmits an Acknowledgement (ACK) to the transmitter, indicating successful reception. Otherwise, it transmits a Negative Acknowledgement (NACK), which is interpreted as a request for retransmission.

Due to the broad variety of types of traffic that New Radio targets to support, in some TDD configurations, strict separation of some control plane signaling, such as HARQ feedback, from user data introduces excessive overhead delay into the communication, which could otherwise be used to improve the effective user plane bitrate.

The Background section of this document is provided to place embodiments of the present invention in technological and operational context, to assist those of skill in the art in understanding their scope and utility. Approaches descried in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a radio network device is operative to transmit Uplink Control Information (UCI) only, data only, or both UCI and data together, on the same physical uplink channel. The UCI may comprise a HARQ ACK/NACK. The UCI is configured in response to Downlink Control Information (DCI) received from a serving network node. The DCI also includes a UL scheduling grant for the physical uplink channel. The UCI may be configured in the physical uplink channel transmission in a variety of ways. Various amounts of frequency resource (e.g., subcarriers) may be allocated to UCI. The subcarriers may be contiguous or non-contiguous. In slot aggregation, the UCI subcarriers may frequency hop from slot to slot. The UCI may be encoded differently in different slots, to facilitate early decoding by a receiver (which may, for example immediately prepare a re-transmission in the case of a NACK).

One embodiment relates to a method, performed by a radio network device operative in a wireless communication network utilizing slot timing where a slot comprises a predetermined number of symbols, of transmitting data and UCI. Uplink data are transmitted on a physical uplink shared channel aggregating two or more contiguous slots. In addition to the uplink data, UCI is transmitted in at least one of the aggregated slots.

Another embodiment relates to a radio network device operative in a wireless communication network utilizing slot timing where a slot comprises a predetermined number of symbols. The radio network device includes one or more antennas, a transceiver operatively connected to the antennas, and processing circuitry operatively connected to the transceiver. The processor is operative to transmit uplink data on a physical uplink shared channel aggregating two or more contiguous slots; and transmit, in addition to the uplink data, UCI in at least one of the aggregated slots.

Yet another embodiment relates to an apparatus operative in a wireless communication network utilizing slot timing where a slot comprises a predetermined number of symbols. The apparatus includes a first module operative to transmit uplink data on a physical uplink shared channel aggregating two or more contiguous slots. The apparatus further includes a second module operative to transmit, in addition to the uplink data, UCI in at least one of the aggregated slots.

Yet another embodiment relates to a method, performed by network node in a wireless communication network utilizing slot timing where a slot comprises a predetermined number of symbols, of receiving data and UCI from a radio network device. Uplink data are received on a physical uplink shared channel aggregating two or more contiguous slots. In addition to the uplink data, UCI is received in at least one of the aggregated slots.

Yet another embodiment relates to a network node operative in a wireless communication network utilizing slot timing where a slot comprises a predetermined number of symbols. The network node includes one or more antennas, a transceiver operatively connected to the antennas, and processing circuitry operatively connected to the transceiver. The processor is operative to receive uplink data on a physical uplink shared channel aggregating two or more contiguous slots; and receive, in addition to the uplink data, UCI in at least one of the aggregated slots.

Yet another embodiment relates to an apparatus operative in a wireless communication network utilizing slot timing where a slot comprises a predetermined number of symbols. The apparatus includes a first module operative to receive uplink data on a physical uplink shared channel aggregating two or more contiguous slots. The apparatus further includes a second module operative to receive, in addition to the uplink data, UCI in at least one of the aggregated slots.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 21 is a block diagram of an apparatus for receiving UCI.

FIG. 22 is a block diagram of an apparatus for transmitting UCI.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
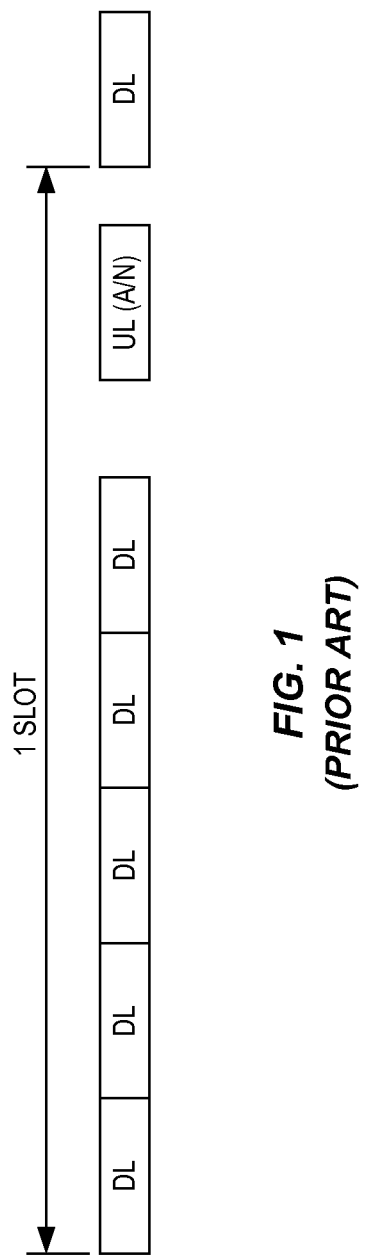
FIG. 1 is a timing diagram depicting a prior art TDD HARQ transmission.

FIG. 1 depicts a frame structure that is commonly considered for New Radio (NR) Time Division Duplex (TDD) operation. In this frame structure, a downlink transmission is followed by a short uplink transmission to feed back a HARQ ACK/NACK indication. Depending on the decoding latency of the radio network device, the ACK/NACK may relate to a downlink transmission in the same slot interval, or it may relate to an earlier downlink transmission. The uplink transmission depicted at the end of the slot may not be present in every slot; also, there may be slots containing only downlink or only uplink transmissions.

NR is targeted to cover a very wide application space. For example, it will support Mobile Broadband (MBB), with very wide bandwidth and high data rates, as well as Machine-to-Machine (M2M) type communications, which are often characterized by narrow bandwidth, low power, and low data rates. MBB services benefit from a frame structure using slots similar to that defined for the Long Term Evolution (LTE) 4G protocol. For latency critical services, a slot duration of 1 ms may be too long. The choice of the slot length is a compromise between MBB requirements (which often benefit from larger subframe durations) and latency critical services. It is anticipated that a slot will be defined as 7 and/or 14 symbols in the 3GPP NR 5G protocol.

Figure 2:
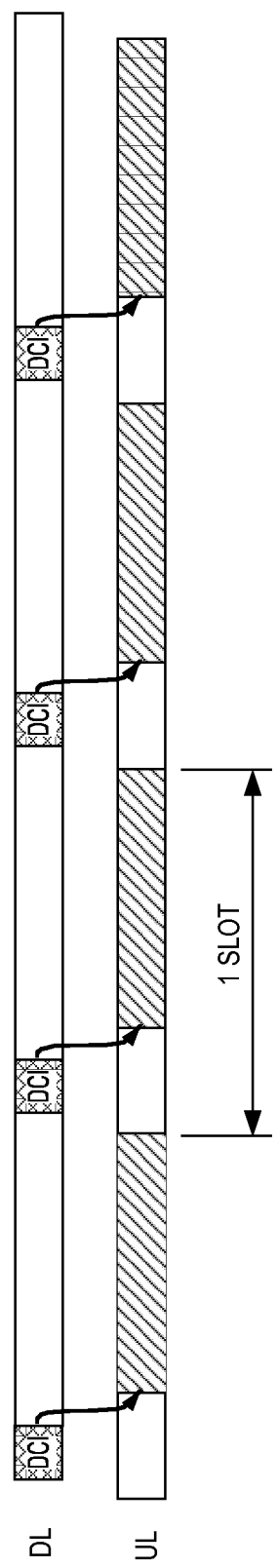
FIG. 2 is a timing diagram depicting DCI configuring uplink transmission in TDD.

FIG. 2 depicts a use case of heavy uplink transmissions. In this case, a single slot is too short and multiple uplink transmissions are scheduled subsequently. The uplink transmission in each slot is controlled by an UL scheduling grant included in Downlink Control Information (DCI) transmitted in the downlink. Each time the duplex direction is changed, a guard interval is required to enable interference-free UL-to-DL and to DL-to-UL switches. For uplink-heavy MBB transmissions, a common scheduling pattern would be that depicted in FIG. 2. The numerous guard periods required for the UL/DL switching result in high overhead.

Figure 3:
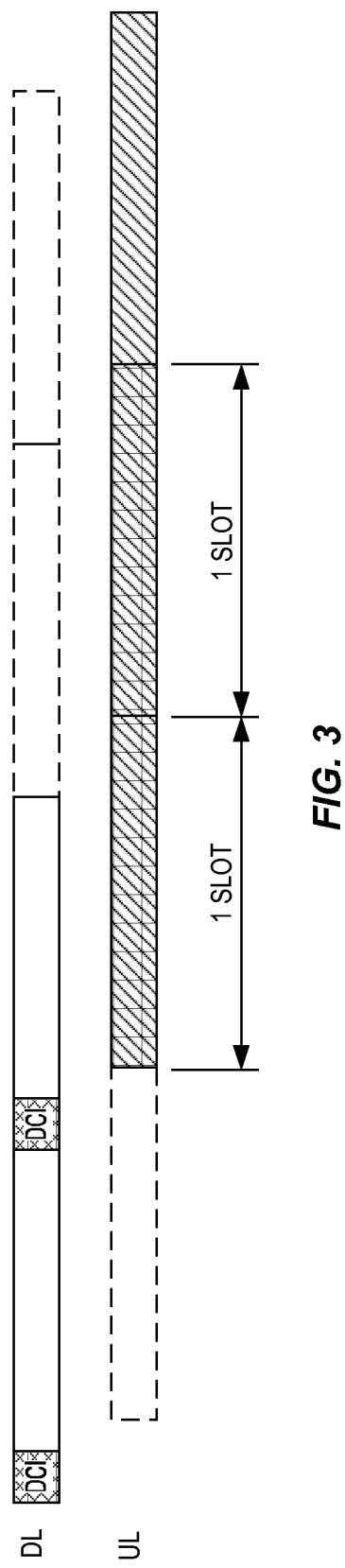
FIG. 3 is a timing diagram depicting slot aggregation in TDD.

FIG. 3 depicts slot aggregation, or slot bundling. This is a proposed approach to alleviating the high-overhead situation of FIG. 2. In this case, multiple uplink slots are scheduled for the same UE, and only one DCI is required to configure them. In a TDD system, the largest overhead saving results from the fewer guard times, as compared to the single-slot UL scheduling depicted in FIG. 2.

As mentioned, it is anticipated that the NR frame structure will feature a slot length of 7 and/or 14 symbols. HARQ feedback will be required for each downlink transmission. To fit this feedback into a small portion at the end of a slot, the UL transmission must be very short, typically one, or a very few, symbols. Depending on the numerology, one OFDM symbol has length $$\frac{67us}{2^n}$$

with n the numerology scaling factor. For LTE-like deployments at least n=0 (15 kHz) and n=1 (30 kHz) are interesting options. Feedback transmission over one or a few OFDM symbols is much shorter than the LTE Physical Uplink Control Channel (PUCCH) transmission duration of 1 ms, with accordingly reduced coverage. To match the LTE PUCCH link budget, it should be possible to transmit HARQ feedback in UL over a duration of around 1 ms.

Figure 4:
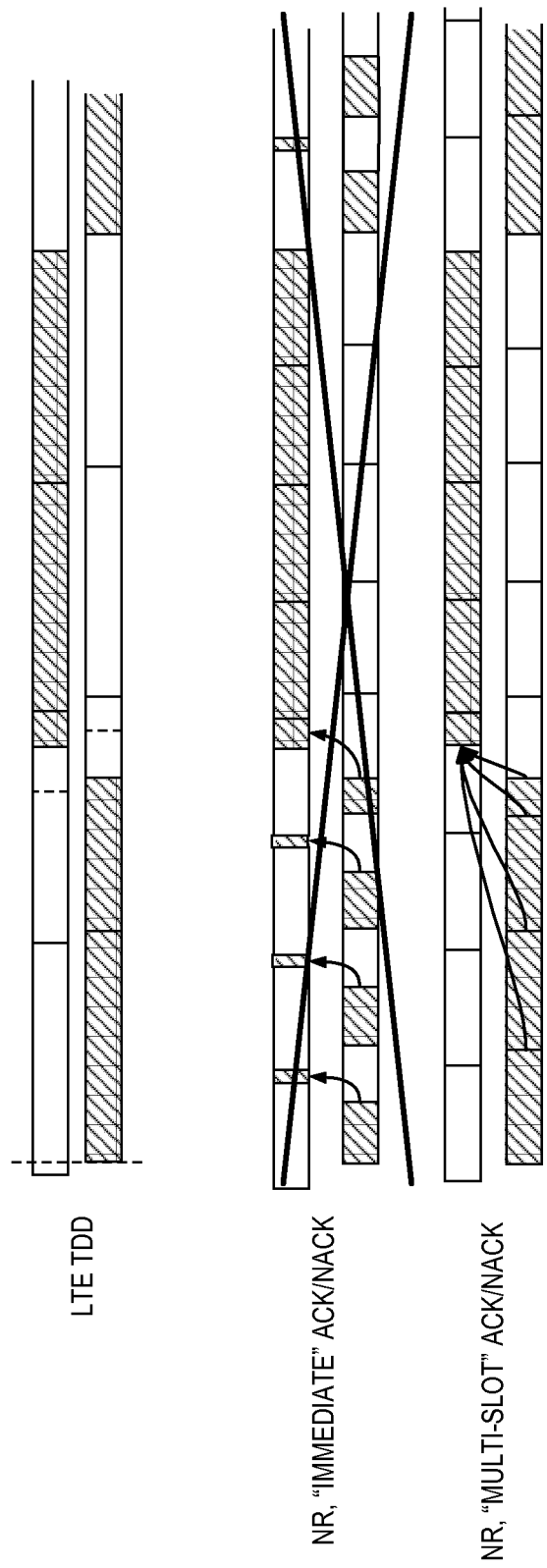
FIG. 4 is a timing diagram depicting required HARQ configuration in NR TDD to conform to LTE TDD.

It is envisioned that NR can coexist with L TE Frame Structure type 2 (FS2) if deployed in the same frequency band. Depending on the interference situation, this may require that L TE and NR use the same DU/UL pattern in TDD implementations. In such cases it is not possible to transmit UL HARQ feedback at the end of a DL-heavy slot. Rather, for co-existence, the UL transmission must be delayed until the next UL opportunity in L TE FS2. FIG. 4 depicts this situation. Accordingly, HARQ feedback transmitted at the end of a DL-heavy subframe is not sufficient to cover all deployments of NR.

No NR UL HARQ feedback scheme has yet been defined; HARQ feedback transmitted at the slot end is often mentioned as a candidate. PUCCH is defined for LTE. Additionally, the transmission of Uplink Control Information (UCI), which may include HARQ, may occur in LTE on the Physical Uplink Shared Channel (PUSCH). PUSCH in LTE uses Discrete Fourier Transform (DFT) spread Orthogonal Frequency Division Multiplexing (OFDM), or DFTS-OFDM. OFDM is assumed herein. Additionally, in LTE, PUSCH has a fixed length, whereas slot aggregation is assumed herein.

According to embodiments of the present invention, one physical uplink channel can be used for data only, UCI (e.g., HARQ feedback) only, or both UCI and data. This simplifies the required design and control channel resource, since one UL grant can be used for a combined "data+HARQ feedback" transmission—in contrast, two UL grants would be required if each transmission were to be transmitted on its own physical channel.

If the receiving network node can decode the HARQ feedback before the UL transmission ends, the remaining UL transmission time can be used by the network node for internal processing to prepare a re-transmission (if needed) for the next slot.

Accordingly, embodiments are described herein in which it is possible to transmit HARQ feedback on a scheduled UL channel (typically together with data). In particular, embodiments comprise a mechanism to differentiate between the cases where only HARQ feedback bits are transmitted, and where both data and HARQ feedback are transmitted together. Embodiments further comprise a coding and mapping of HARQ feedback to UL resources that enables early decoding at the receiving network node. In particular, decoding should be possible in good channel conditions before the UL transmission ends.

NR supports dynamic TDD, where HARQ feedback bits of multiple HARQ processes must be transmitted in a single UL transmission. A physical uplink channel is defined, which may be similar in some respects to the LTE PUSCH. The physical uplink channel may be used for both data and Uplink Control Information (UCI) such as HARQ ACK/NACK feedback.

The physical uplink channel is scheduled via Downlink Control Information (DCI), containing an UL grant, transmitted by the serving network node. Since, in some embodiments, the physical uplink channel can be transmitted over multiple slots, an UL grant contains, in addition to the frequency resources, also time-domain resources (e.g., which or how many slots are used for the physical uplink channel). The time-domain resource signaling may be explicit in the DCI; alternatively, it may be derived implicitly from other parameters. The frequency-domain mapping of the physical uplink channel can be both localized and distributed, since a multi-carrier scheme is assumed in UL.

The DCI specifying the UL transmission may contain an indicator whether, e.g., UCI only, data only, or both UCI and data together will be transmitted on the physical uplink channel. In one embodiment, the indicator is a flag (e.g., a bit) indicating whether UCI should be transmitted. The DCI may additionally contain other parameters, such as a Transport Block (TB) size parameter, a Modulation and Coding Scheme (MCS) or Multiple Input Multiple Output (MIMO) related parameters. In one embodiment, the indicator comprises a TB size parameter having a zero value if only UCI should be transmitted on the physical uplink channel. In another embodiment, this may be indicated by a reserved code point in the DCI. In this case some other DCI fields related to data transmission may become irrelevant and be omitted, set to a fixed value, or reused for other purposes.

Figure 5:
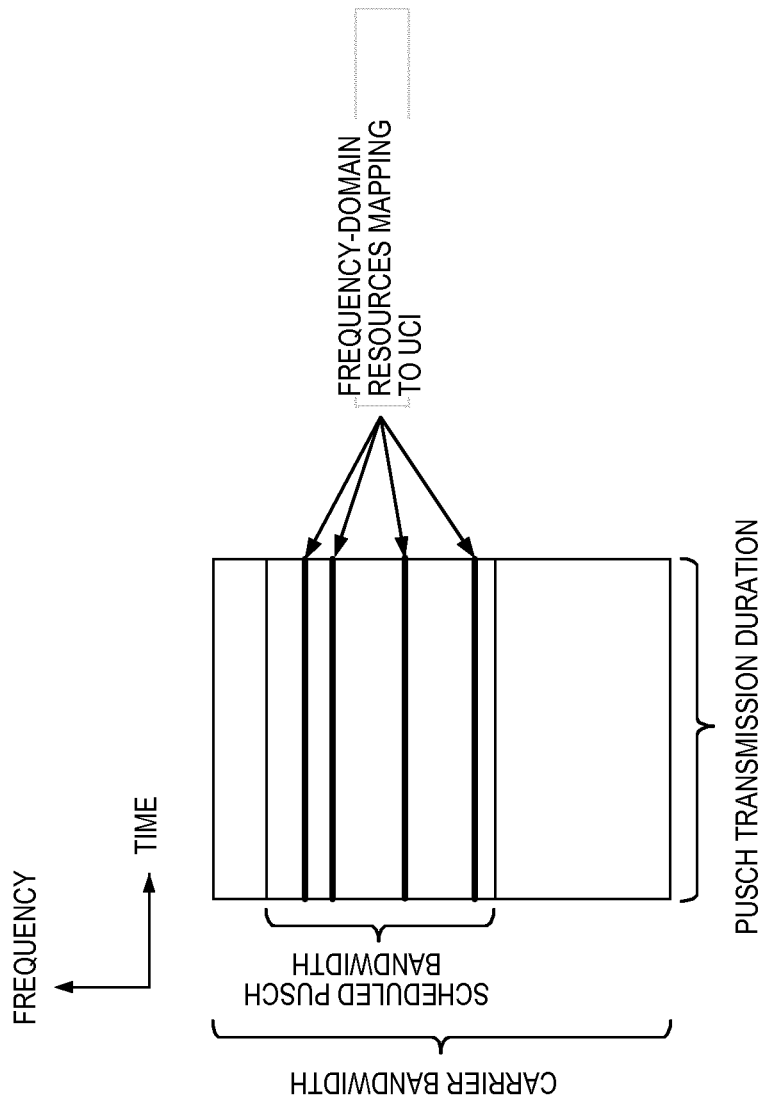
FIG. 5 is a time/frequency diagram depicting non-contiguous subcarrier allocation to UCI.

Based on at least the frequency-domain location of the physical uplink channel (derived from information in the DCI), the radio network device can calculate the resource elements (RE) which are used for data and those which are used for UCI. To obtain frequency diversity, the mapping of UCI to subcarriers is preferably distributed within the physical uplink channel. FIG. 5 depicts an example of this.

Several allocation schemes are envisioned. In one embodiment, the number of subcarriers (frequency resources) of the physical uplink channel allocated to UGI can be a fixed percentage of the total allocated resources. In one embodiment, the allocation may deviate from this fixed percentage to comply with a lower and/or upper cap, to avoid allocating too few or too many resources, respectively. In one embodiment, a fixed absolute number of subcarriers may be allocated to UGI, which in one embodiment may depend on the amount of resources allocated to the physical uplink channel. In another embodiment, the allocation of frequency resources in the physical uplink channel to UGI may depend on one or more other parameters, such as MCS or MIMO configuration. If no data are transmitted on the physical uplink channel, all scheduled resources are used for UGI transmission.

Figure 6:
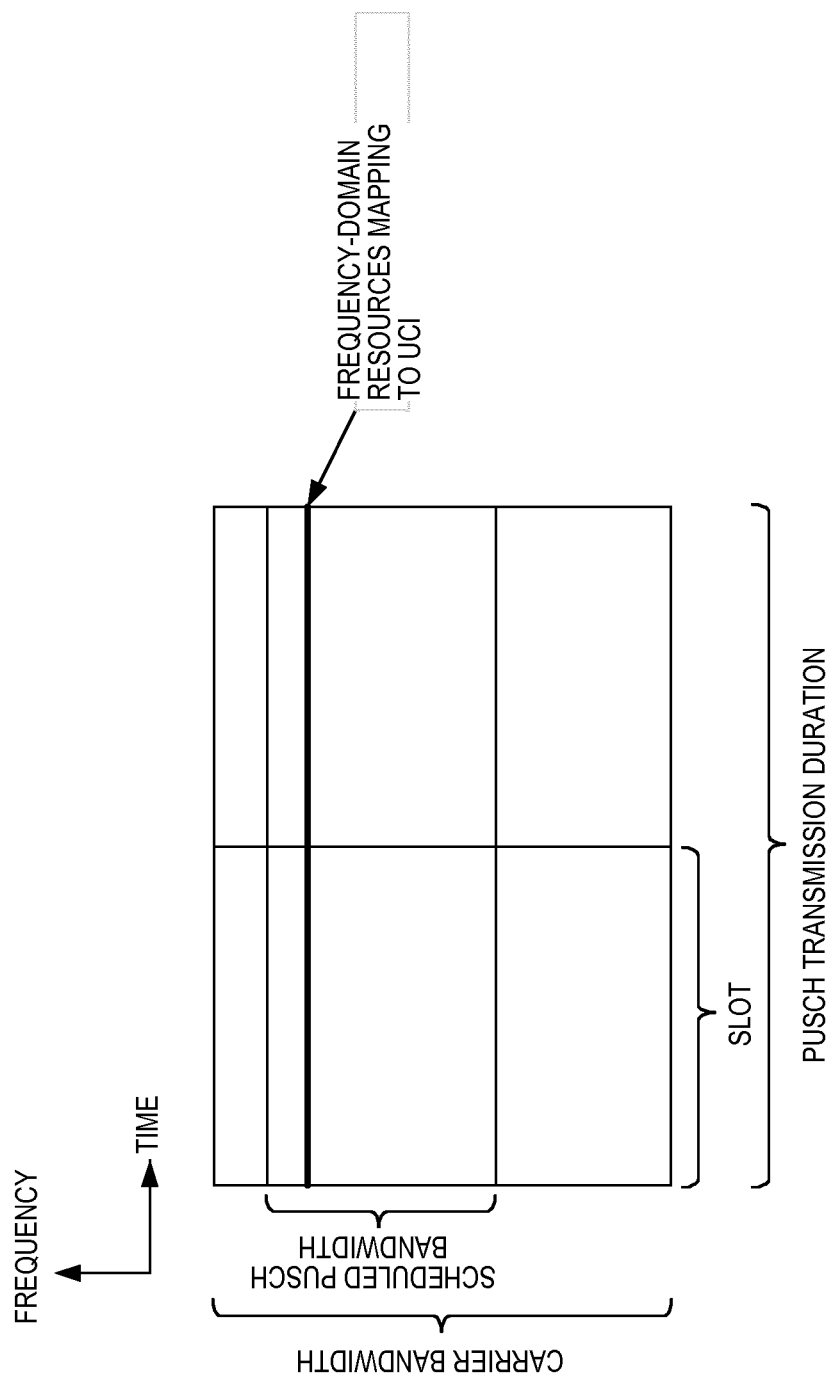
FIG. 6 is a time/frequency diagram depicting multi-slot UCI allocation.

Uplink transmission in NR supports slot aggregation. That is, an UL transmission may span two or more slots. FIG. 6 depicts a transmission in which two slots are aggregated. The localized physical uplink channel is only one example; in general, the allocation of frequency resources to the physical uplink channel may be localized or distributed.

Similarly, the localized UCI mapping per slot is only a representative example; in general, both localized and distributed mapping are within the scope of embodiments of the present invention.

Figure 7:
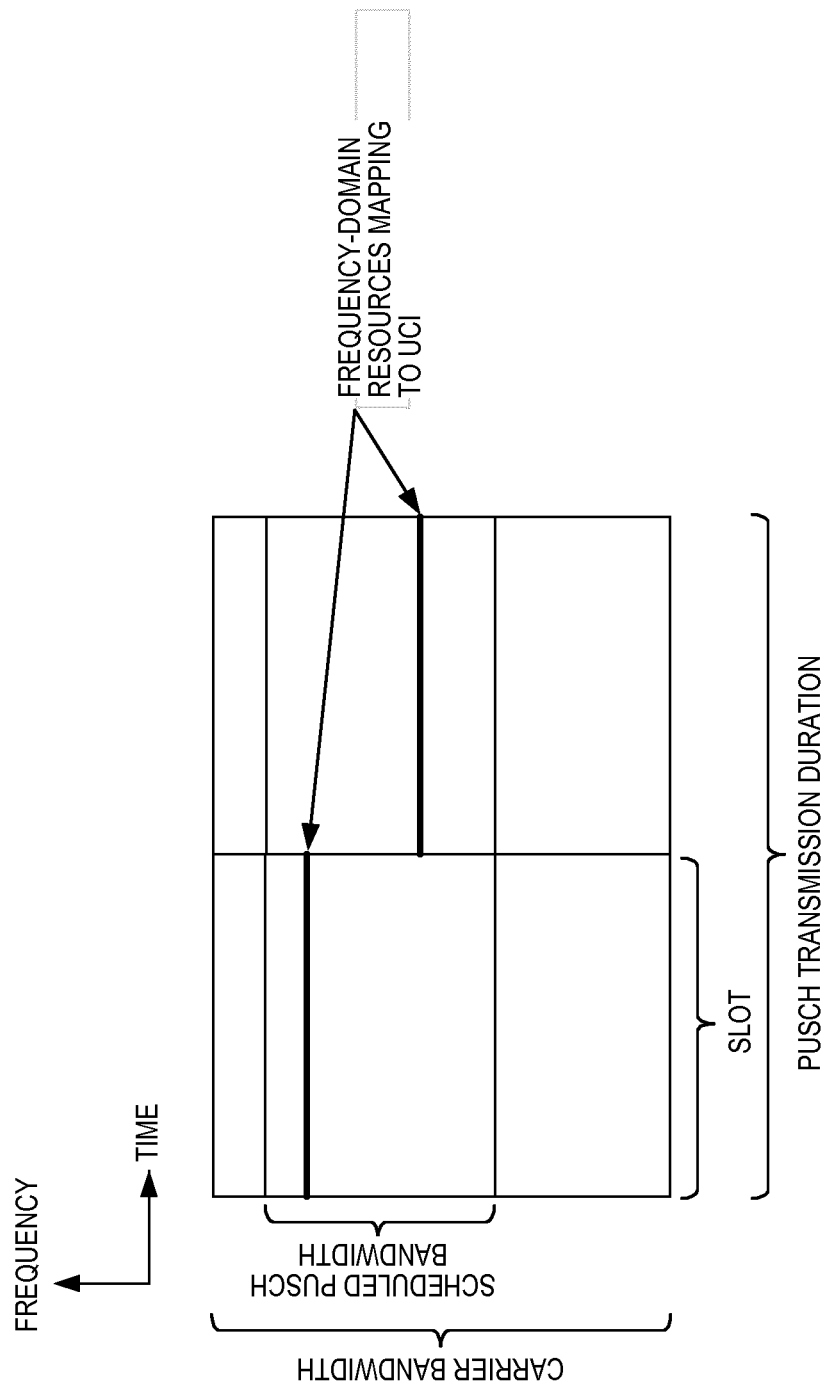
FIG. 7 is a time/frequency diagram depicting slot-to-slot UCI frequency hopping.

In one embodiment, in slot aggregation, the frequency allocation of UCI subcarriers within the physical uplink channel frequency allocation varies from slot to slot, to achieve frequency diversity, even if the physical uplink channel itself is transmitted without frequency hopping. In this case, the hopping pattern may follow a pseudo random pattern derived from information available to both the radio network device and network node. Examples include a subframe number, device identity, the number of transmitted slots, and the like. FIG. 7 depicts an example of UCI subcarrier allocation frequency hopping slot-to-slot within the physical uplink channel.

Figure 8:
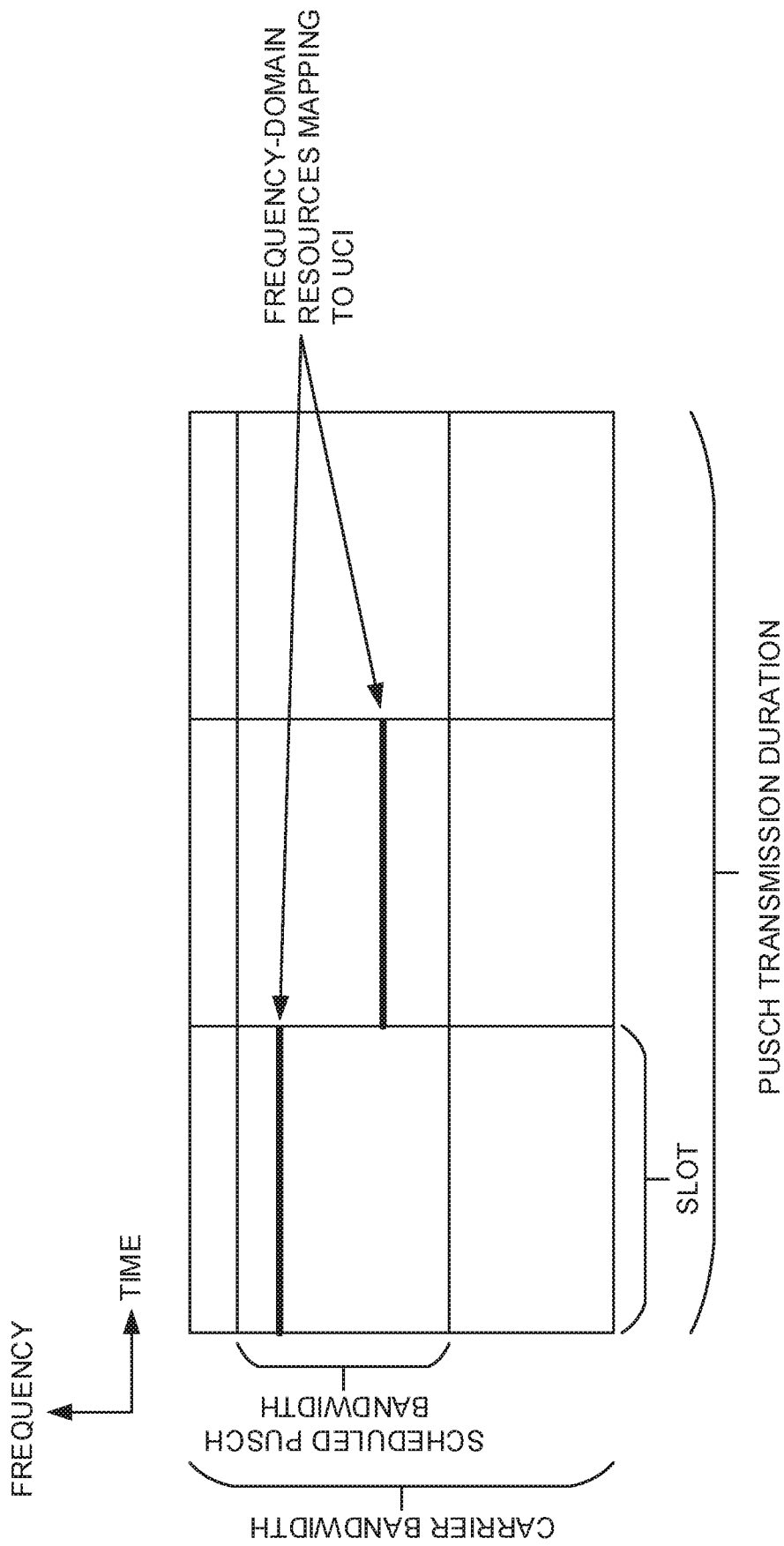
FIG. 8 is a time/frequency diagram depicting UCI transmission in fewer than all slots of a slot aggregation.

FIG. 8 depicts a case of slot aggregation, according to one embodiment, in which the slots containing UCI are designated. An indication of the number of slots containing UCI, and/or which slots those are, may be dynamic (e.g., in the DCI containing the UL grant), or semi-static (e.g., via configuration or higher layer signaling). The number and location of UCI slots may also be derived from other DCI/scheduling parameters. For example, if very high MCS and/or MIMO and/or TB size and/or wide resource allocation is used (indicating a high SINR), the UCI may not need to extend across all slots in a long slot aggregate, but may only be transmitted over a few. In one embodiment, the length indication may be a combination of an explicit information field in the DCI and other DCI/scheduling parameters. For example, an explicit bit may indicate "UCI is transmitted across all slots" or "UCI is transmitted across variable number of slots," and the variable number of slots would be derived from other DCI/scheduling parameters. In one embodiment, varying the number of slots over which UCI is transmitted (either by varying the slot aggregate length or by varying which slots in the aggregate contain UCI) is used for link adaptation of UCI transmission.

In some embodiments, the UCI always spans all slots of the physical uplink channel. In this case, or even in the case that it is transmitted in several slots but not necessarily all, the first slot (or at least the first few slots in the slot aggregate) contains sufficient UCI information to enable independent decoding. That is, the UCI in the first slot (or first few slots) is encoded with a code rate<=1.

In one embodiment, each slot (or group of a few slots) contains encoded UCI, which are repeated several times. In good channel conditions, UCI can be decoded after the first copy. If the receiver does not succeed in decoding the UCI, it can combine the information contained in the subsequent copies (e.g., maximum-ratio combining, such as Chase combining) to achieve successful decoding.

Figure 9:
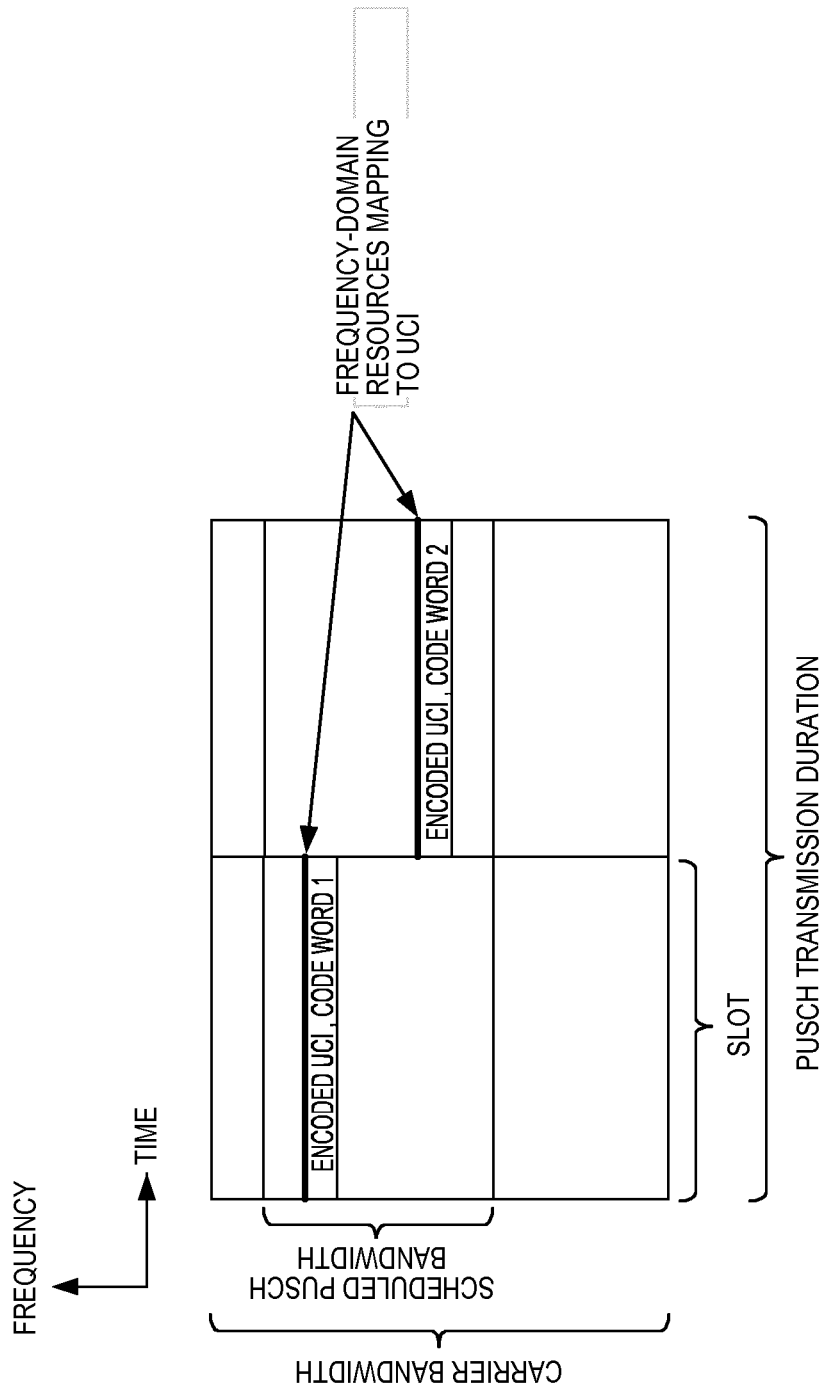
FIG. 9 is a time/frequency diagram depicting UCI coding in slot aggregation.

Another embodiment employs incremental redundancy. UCI in the first slot (or first few slots) is encoded to enabling decoding under good channel conditions. In subsequent slots redundancy is added, i.e., incremental redundancy. If the receiver fails to decode the UCI after the first slot (or first few slots) the receiver combines the information in subsequent slots and thereby reduces the effective code rate. FIG. 9 depicts these embodiments.

Figure 10:
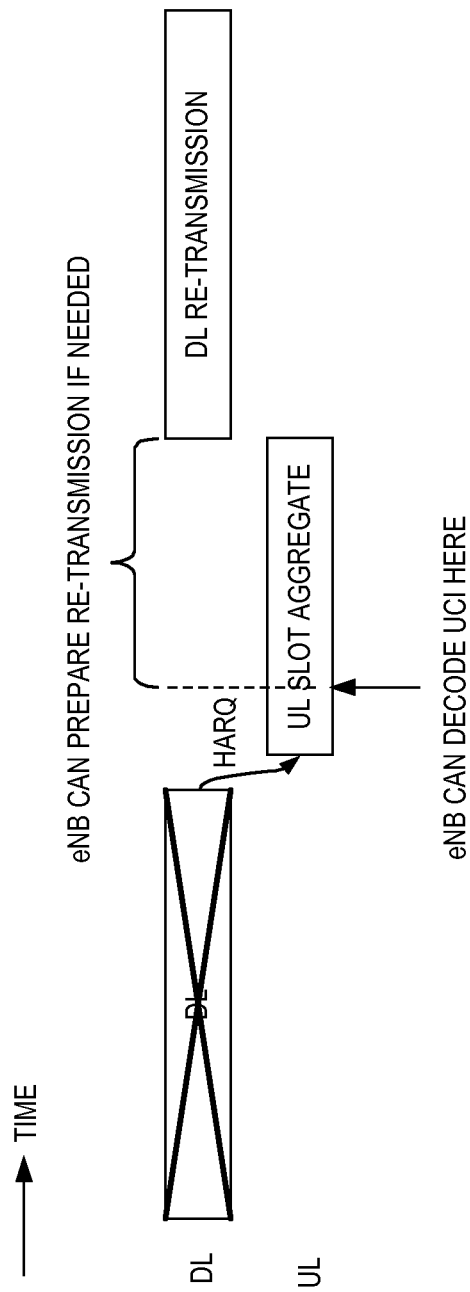
FIG. 10 is a time/frequency diagram depicting an advantage of early UCI decoding.

It is advantageous for the network node to be able to decode UCI early within the UL transmission, since this provides the node time to process the UCI (e.g., HARQ feedback). In the case of a NACK, the network node can prepare the re-transmission during the ongoing UL transmission, and perform the DL re-transmission after the UL transmission has ended. FIG. 10 depicts an example.

Figure 11:
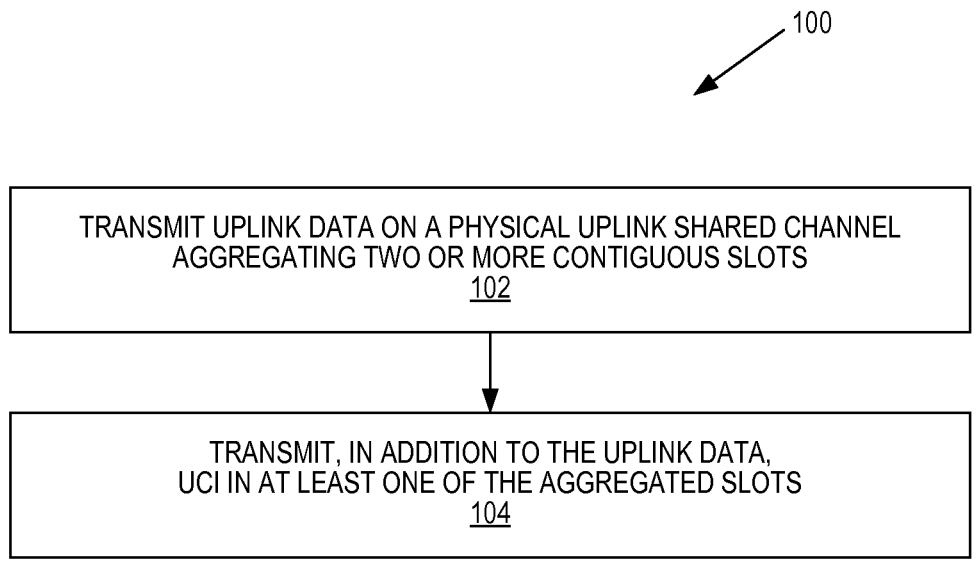
FIG. 11 is flow diagram of a method of transmitting UCI.

FIG. 11 illustrates a method 100, performed by a radio network device operative in a wireless communication network utilizing slot timing where a slot comprises a predetermined number of symbols, of transmitting data and UCI. Uplink data is transmitted on a physical uplink shared channel aggregating two or more contiguous slots (block 102). In addition to the uplink data, UCI is transmitted in at least one of the aggregated slots (block 104).

Figure 12:
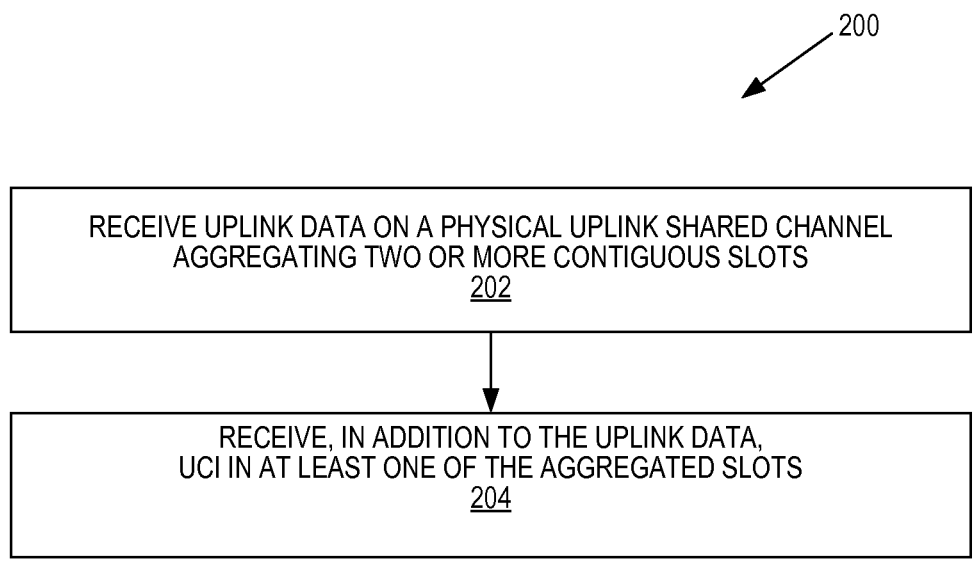
FIG. 12 is flow diagram of a method of receiving UCI.

FIG. 12 illustrates a method 200, performed by network node in a wireless communication network utilizing slot timing where a slot comprises a predetermined number of symbols, of receiving data and UCI from a radio network device. Uplink data is received on a physical uplink shared channel aggregating two or more contiguous slots (block 202). In addition to the uplink data, UCI is received in at least one of the aggregated slots (block 204).

Figure 13:
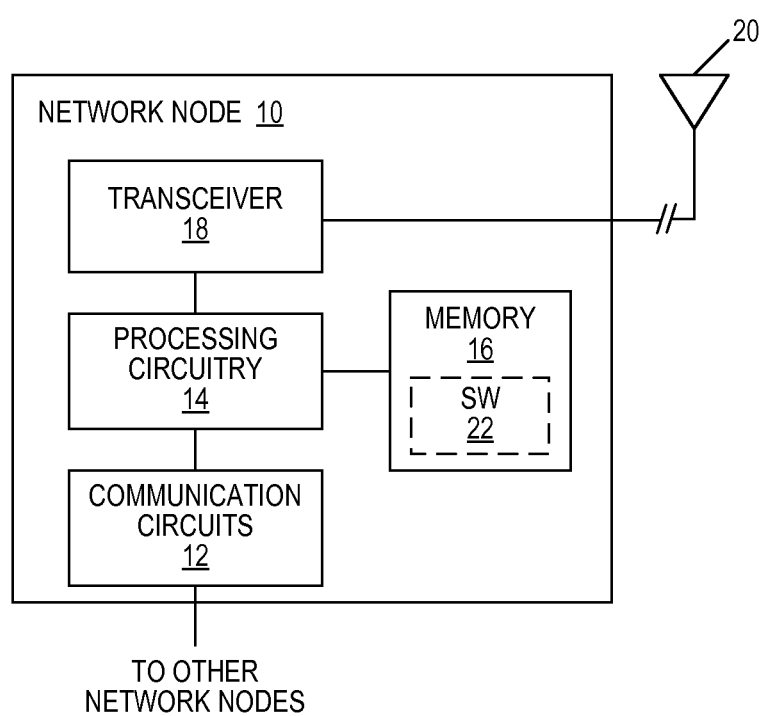
FIG. 13 is a block diagram of a network node.

FIG. 13 depicts a network node 10 operative in a wireless communication network. The network node 10 includes communication circuits 12 operative to exchange data with other network nodes; processing circuitry 14; memory 16; and radio circuits, such as a transceiver 18, one or more antennas 20, and the like, to effect wireless communication across an air interface to one or more radio network devices. As indicated by the broken connection to the antenna(s) 20, the antenna(s) may be physically located separately from the network node 10, such as mounted on a tower, building, or the like. Although the memory 16 is depicted as being separate from the processing circuitry 14, those of skill in the art understand that the processing circuitry 14 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud").

According to embodiments of the present invention, the memory 16 is operative to store, and the processing circuitry 14 is operative to execute, software 22 which when executed is operative to cause the network node 10 to receive data and UCI from a radio network device on a physical uplink shared channel aggregating two or more contiguous slots, wherein the UCI is received in at least one of the aggregated slots. In particular, the software 22, when executed on the processing circuitry 14, is operative to perform the method 200 described and claimed herein.

Figure 14:
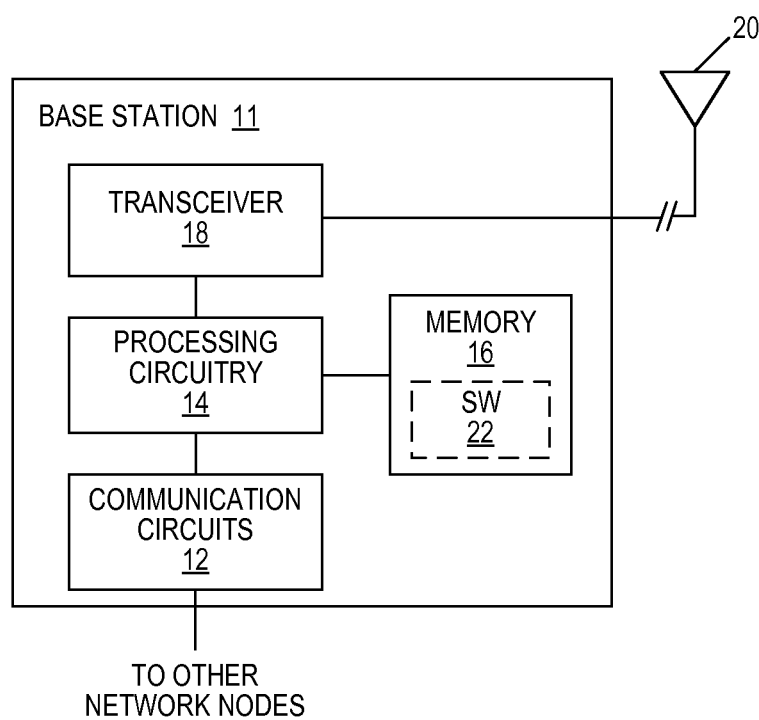
FIG. 14 is a block diagram of a base station.

FIG. 14 depicts an embodiment in which the network node 10 of FIG. 13 is a base station 11 providing wireless communication services to one or more radio network devices in a geographic region (known as a cell or sector). A base station in LTE is called an e-NodeB or eNB; however the present invention is not limited to LTE or eNBs.

Figure 15:
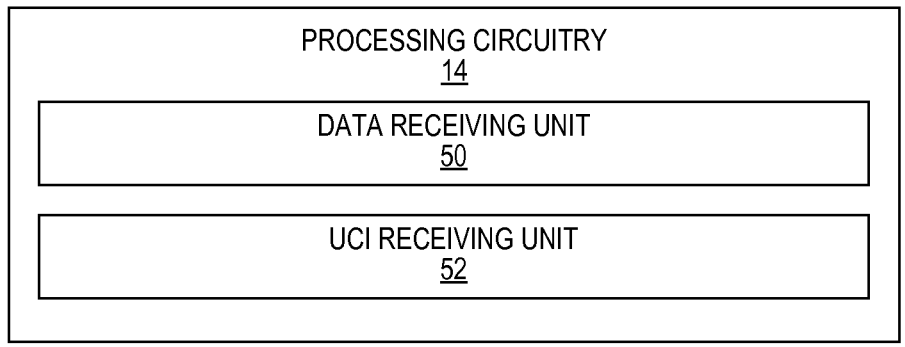
FIG. 15 is diagram of processing circuits in a network node or base station.

FIG. 15 illustrates example processing circuitry 14, such as that in the network node 10 of FIG. 13 or base station 11 of FIG. 14. The processing circuitry 14 comprises a plurality of physical units. In particular, the processing circuitry 14 comprises a data receiving unit 50 and a UCI receiving unit 52. The data receiving unit 50 is configured to receive uplink data on a physical uplink shared channel aggregating two or more contiguous slots. The UCI receiving unit 52 is configured to receive UCI in at least one of the aggregated slots.

Figure 16:
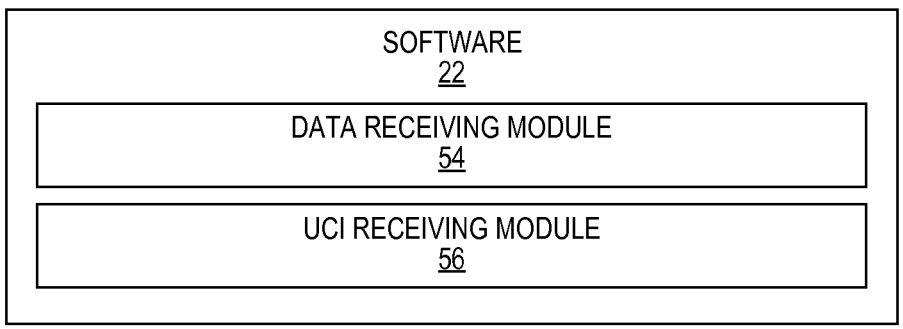
FIG. 16 is diagram of software modules in a network node or base station.

FIG. 16 illustrates example software 22, such as that depicted in the memory 16 of the network node 10 of FIG. 13 or base station 11 of FIG. 14. The software 22 comprises a plurality of software modules. In particular, the software 22 comprises a data receiving module 54 and a UCI receiving module 56. The data receiving module 54 is configured to receive uplink data on a physical uplink shared channel aggregating two or more contiguous slots. The UCI receiving module 56 is configured to receive UCI in at least one of the aggregated slots.

Figure 17:
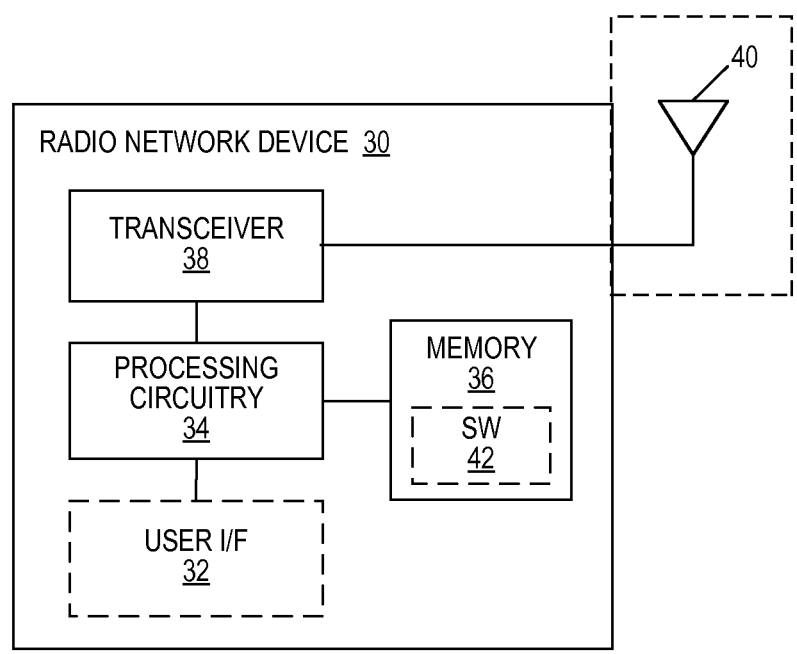
FIG. 17 is a block diagram of a radio network device.

FIG. 17 depicts a radio network device 30 operative in embodiments of the present invention. A radio network device 30 is any type device capable of communicating with a network node 10 and/or base station 11 over radio signals. A radio network device 30 may therefore refer to a machine-to-machine (M2M) device, a machine-type communications (MTC) device, a Narrowband Internet of Things (NB-IoT) device, etc. The radio network device may also be a User Equipment (UE); however it should be noted that the UE does not necessarily have a "user" in the sense of an individual person owning and/or operating the device. A radio network device may also be referred to as a radio device, a radio communication device, a wireless communication device, a wireless terminal, or simply a terminal— unless the context indicates otherwise, the use of any of these terms is intended to include device-to-device UEs or devices, machine-type devices or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

A radio network device 30 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In some embodiments, the radio network device 30 includes a user interface 32 (display, touchscreen, keyboard or keypad, microphone, speaker, and the like); in other embodiments, such as in many M2M, MTC, or NB-IoT scenarios, the radio network device 30 may include only a minimal, or no, user interface 32 (as indicated by the dashed lines of block 32 in FIG. 17). The radio network device 30 also includes processing circuitry 34; memory 36; and radio circuits, such a transceiver 38, one or more antennas 40, and the like, to effect wireless communication across an air interface to one or more network nodes 10, 11. As indicated by the dashed lines, the antenna(s) 40 may protrude externally from the radio network device 30, or the antenna(s) 40 may be internal.

According to embodiments of the present invention, the memory 36 is operative to store, and the processing circuitry 34 operative to execute, software 42 which when executed is operative to cause the radio network device 30 to transmit uplink data on a physical uplink shared channel aggregating two or more contiguous slots and, in addition to the uplink data, transmit UCI in at least one of the aggregated slots, as described and claimed herein. In particular, the software 42, when executed on the processing circuitry 34, is operative to perform the method 100 described and claimed herein.

Figure 18:
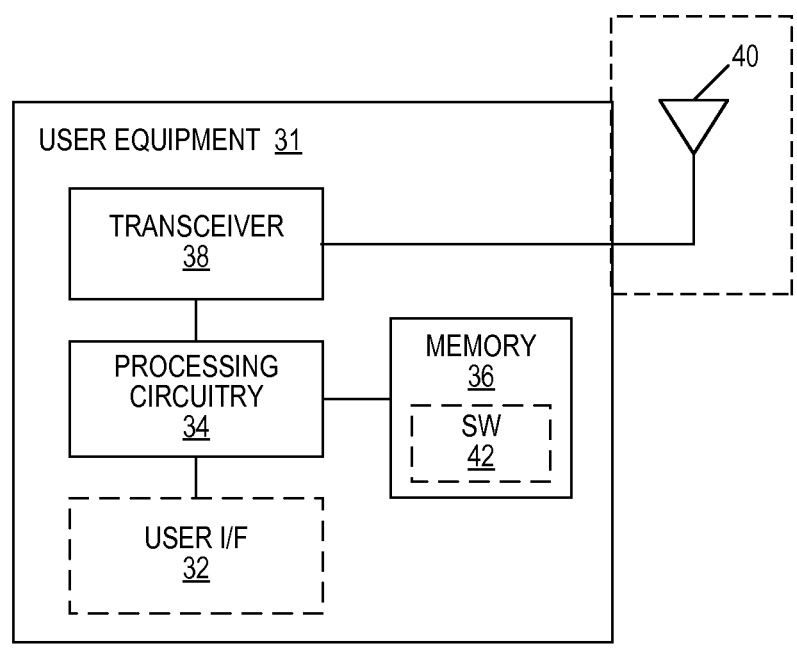
FIG. 18 is a block diagram of a User Equipment.

FIG. 18 depicts an embodiment in which the radio network device 30 is a User Equipment (UE) 31. In some embodiments, the UE 31 may additionally include features such as a camera, removable memory interface, short-range communication interface (Wi-Fi, Bluetooth, and the like), wired interface (USB), battery recharge port, and the like (these features are not shown in FIG. 18).

Figure 19:
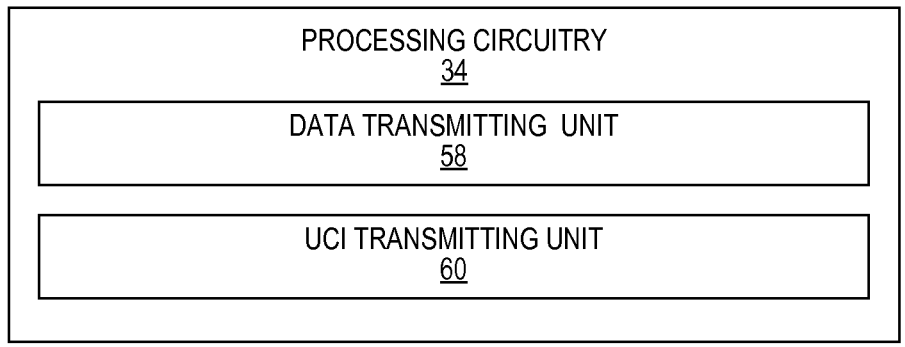
FIG. 19 is a diagram of processing circuits in a radio network device or UE.

FIG. 19 illustrates example processing circuitry 34, such as that in the radio network device 30 of FIG. 17 or UE 31 of FIG. 18. The processing circuitry 34 comprises a plurality of physical units. In particular, the processing circuitry 34 comprises a data transmitting unit 58 and a UCI transmitting unit 60. The data transmitting unit 58 is configured to transmit uplink data on a physical uplink shared channel aggregating two or more contiguous slots. The UCI transmitting unit 60 is configured to transmit, in addition to the uplink data, UCI in at least one of the aggregated slots.

Figure 20:
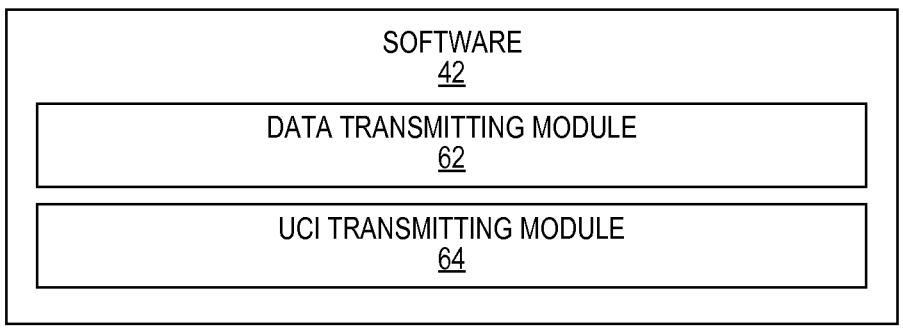
FIG. 20 is a diagram of software modules in a radio network device or UE.

FIG. 20 illustrates example software 42, such as that depicted in the memory 36 of the radio network device 30 of FIG. 17 or UE 31 of FIG. 18. The software 42 comprises a plurality of software modules. In particular, the software 42 comprises a data transmitting module 62 and UCI transmitting module 64. The data transmitting module 62 is configured to transmit uplink data on a physical uplink shared channel aggregating two or more contiguous slots. The UCI transmitting module 64 is configured to transmit, in addition to the uplink data, UCI in at least one of the aggregated slots.

In all embodiments, the processing circuitry 14, 34 may comprise any sequential state machine operative to execute machine instructions stored as machine-readable computer programs in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 18, 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, or the like. The transceiver 18, 38 implements transmitter and receiver functionality appropriate to the RAN links (e.g., frequency allocations and the like). The transmitter and receiver functions may share circuit components and/or software, or alternatively may be implemented separately.

In all embodiments, the communication circuits 12 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

FIG. 21 illustrates a plurality of modules comprising a virtual function module architecture of an apparatus operative in a wireless communication network. A first module 66 is configured to receive uplink data on a physical uplink shared channel aggregating two or more contiguous slots. A second module 68 is configured to receive, in addition to the uplink data, UCI in at least one of the aggregated slots.

FIG. 22 illustrates a plurality of modules comprising a virtual function module architecture of an apparatus operative in a wireless communication network. A first module 70 is configured to transmit uplink data on a physical uplink shared channel aggregating two or more contiguous slots. A second module 72 is configured to transmit, in addition to the uplink data, UCI in at least one of the aggregated slots.

Embodiments of the present invention present numerous advantages over the prior art. With the flexibility of mixing UCI and data in the same physical uplink channel, overhead is reduced by eliminating guard bands required when switching between UL and DL in TDD. Furthermore, in some cases envisioned in NR, proposed HARQ schemes may be unavailable, such as due to a co-existence requirement with LTE FS2. Allocations of UCI within the physical uplink channel may be configured to improve performance. For example, the UCI may be spread among frequency resources (e.g., subcarriers) within the physical uplink channel allocation for frequency diversity. As another example, in slot aggregation, the UCI may frequency hop between slots. The UCI may be encoded to facilitate early decoding, which may improve re-transmission time in the case of a NACK. The UCI may be replicated (fully or using incremental redundancy) across slots to facilitate UCI decoding in poor channel conditions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a radio network device operative in a wireless communication network utilizing slot timing where a slot comprises a predetermined number of symbols, of transmitting data and Uplink Control Information (UCI), the method comprising:
   transmitting uplink data on a physical uplink shared channel aggregating two or more contiguous slots for an uplink transmission spanning the aggregated slots;
   receiving an indication of one or more, but fewer than all of the aggregated slots in which to transmit UCI; and
   transmitting, in addition to the uplink data, UCI in the indicated one or more, but fewer than all of the aggregated slots on the physical uplink shared channel.

2. The method of claim 1 wherein transmitting UCI comprises:
   receiving an indication of the number of the aggregated slots in which to transmit UCI; and
   transmitting UCI in the indicated number of aggregated slots, beginning with the first slot.

3. The method of claim 1 wherein transmitting UCI comprises transmitting the UCI on the same subcarrier across two or more of the aggregated slots.

4. The method of claim 1 wherein transmitting UCI comprises transmitting the UCI on different subcarriers in two or more of the aggregated slots.

5. The method of claim 4 wherein transmitting the UCI on different subcarriers in two or more of the aggregated slots comprises selecting the subcarriers according to a pseudo random frequency hopping pattern based on one or more of subframe number, radio network device identity, and the number of slots in the transmission.

6. The method of claim 1 wherein UCI is transmitted in at least the first aggregated slot, and further wherein the UCI transmitted in the first aggregated slot is encoded with a code rate$<=1$.

7. A radio network device operative in a wireless communication network utilizing slot timing where a slot comprises a predetermined number of symbols, comprising:
   one or more antennas;
   a transceiver operatively connected to the antennas; and
   processing circuitry operatively connected to the transceiver and operative to
      transmit uplink data on a physical uplink shared channel aggregating two or more contiguous slots for an uplink transmission spanning the aggregated slots;
      receive an indication of one or more, but fewer than all of the aggregated slots in which to transmit Uplink Control Information (UCI); and
      transmit, in addition to the uplink data, UCI, in the indicated one or more, but fewer than all of the aggregated slots on the physical uplink shared channel.

8. The radio network device of claim 7 wherein the processing circuitry is operative to transmit UCI by:
   receiving an indication of the number of the aggregated slots in which to transmit UCI; and
   transmitting UCI in the indicated number of aggregated slots, beginning with the first slot.

9. The radio network device of claim 7 wherein the processing circuitry is operative to transmit UCI by transmitting the UCI on the same subcarrier across two or more of the aggregated slots.

10. The radio network device of claim 7 wherein the processing circuitry is operative to transmit UCI by transmitting the UCI on different subcarriers in two or more of the aggregated slots.

11. The radio network device of claim 10 wherein transmitting the UCI on different subcarriers in two or more of the aggregated slots comprises selecting the subcarriers according to a pseudo random frequency hopping pattern based on one or more of subframe number, radio network device identity, and the number of slots in the transmission.

12. The radio network device of claim 7 wherein UCI is transmitted in at least the first aggregated slot, and further wherein the UCI transmitted in the first slot is encoded with a code rate$<=1$.

13. A method, performed by network node in a wireless communication network utilizing slot timing where a slot comprises a predetermined number of symbols, of receiving data and Uplink Control Information (UCI), from a radio network device, comprising:
   receiving from the radio network device uplink data on a physical uplink shared channel aggregating two or more contiguous slots for an uplink transmission spanning the aggregated slots;
   transmitting to the radio network device an indication of one or more, but fewer than all of the aggregated slots in which to transmit UCI; and receiving from the radio network device, in addition to the uplink data, UCI in the indicated one or more, but fewer than all of the aggregated slots on the physical uplink shared channel.

14. The method of claim 13 wherein receiving UCI comprises:
   transmitting to the radio network device an indication of the number of aggregated slots in which to transmit UCI; and
   receiving UCI in the indicated number of aggregated slots, beginning with the first slot.

15. The method of claim 13 wherein receiving UCI comprises receiving the UCI on the same subcarrier across two or more of the aggregated slots.

16. The method of claim 13 wherein receiving UCI comprises receiving the UCI on different subcarriers in two or more of the aggregated slots.

17. The method of claim 16 wherein receiving the UCI on different subcarriers in two or more of the aggregated slots comprises selecting the subcarriers according to a pseudo random frequency hopping pattern based on one or more of subframe number, radio network device identity, and the number of slots in the transmission.

18. The method of claim 13 wherein UCI is received in at least the first slot, and further wherein the UCI received in the first slot is encoded with a code rate<=1.

19. A network node operative in a wireless communication network utilizing slot timing where a slot comprises a predetermined number of symbols, comprising:
   one or more antennas;
   a transceiver operatively connected to the antennas; and
   a processing circuitry operatively connected to the transceiver and operative to
      receive from a radio network device uplink data on a physical uplink shared channel aggregating two or more contiguous slots for an uplink transmission spanning the aggregated slots;
      transmit to the radio network device an indication of one or more, but fewer than all of the aggregated slots in which to transmit Uplink Control Information (UCI); and
      receive from the radio network device, in addition to the uplink data, UCI, in the indicated one or more, but fewer than all of the aggregated slots on the physical uplink shared channel.

20. The network node of claim 19 wherein the processing circuitry is operative to receive UCI by:
   transmitting to the radio network device an indication of the number of aggregated slots in which to transmit UCI; and
   receiving UCI in the indicated number of aggregated slots, beginning with the first slot.

21. The network node of claim 19 wherein the processing circuitry is operative to receive UCI by receiving the UCI on the same subcarrier across two or more of the aggregated slots.

22. The network node of claim 19 wherein the processing circuitry is operative to receive UCI by receiving the UCI on different subcarriers in two or more of the aggregated slots.

23. The network node of claim 22 wherein receiving the UCI on different subcarriers in two or more of the aggregated slots comprises selecting the subcarriers according to a pseudo random frequency hopping pattern based on one or more of subframe number, radio network device identity, and the number of slots in the transmission.

24. The network node of claim 19 wherein UCI is received in at least the first slot, and further wherein the UCI received in the first aggregated slot is encoded with a code rate<=1.

* * * * *

UNITED STATES PATENT AND TRADEMARK OFFICE
CERTIFICATE OF CORRECTION

PATENT NO. : 11,051,283 B2
APPLICATION NO. : 16/338325
DATED : June 29, 2021
INVENTOR(S) : Baldemair et al.

It is certified that error appears in the above-identified patent and that said Letters Patent is hereby corrected as shown below:

In the Specification

Column 6, Line 48, delete "UGI" and insert -- UCI --, therefor.

Column 6, Line 54, delete "UGI," and insert -- UCI, --, therefor.

Column 6, Line 57, delete "UGI" and insert -- UCI --, therefor.

Column 6, Line 61, delete "UGI" and insert -- UCI --, therefor.

Column 9, Lines 23-24, delete "laptop-embedded equipped (LEE)," and insert -- laptop-embedded equipment (LEE), --, therefor.

Signed and Sealed this
Seventeenth Day of May, 2022

Katherine Kelly Vidal
*Director of the United States Patent and Trademark Office*